United States Patent
Soulie

(10) Patent No.: US 9,883,405 B2
(45) Date of Patent: Jan. 30, 2018

(54) METHOD AND SYSTEM FOR SHARING RADIO SPECTRUM

(71) Applicant: THALES, Neuilly-sur-Seine (FR)

(72) Inventor: Antoine Soulie, Gennevilliers (FR)

(73) Assignee: Thales, Courbevoie (FR)

( * ) Notice: Subject to any disclaimer, the term of this patent is extended or adjusted under 35 U.S.C. 154(b) by 0 days.

(21) Appl. No.: 14/586,657

(22) Filed: Dec. 30, 2014

(65) Prior Publication Data

US 2015/0189514 A1 Jul. 2, 2015

(30) Foreign Application Priority Data

Dec. 31, 2013 (FR) ..................................... 13 03117

(51) Int. Cl.
| | |
|---|---|
| *H04W 16/14* | (2009.01) |
| *H04W 72/04* | (2009.01) |
| *H04J 11/00* | (2006.01) |
| *H04L 5/00* | (2006.01) |
| *H04W 16/06* | (2009.01) |
| *H04W 16/18* | (2009.01) |

(52) U.S. Cl.
CPC ........... *H04W 16/14* (2013.01); *H04J 11/005* (2013.01); *H04L 5/0007* (2013.01); *H04L 5/0062* (2013.01); *H04W 16/06* (2013.01); *H04W 72/0453* (2013.01); *H04W 16/18* (2013.01)

(58) Field of Classification Search
CPC ... H04W 28/04; H04W 72/04; H04W 72/042; H04W 88/08; H04L 5/0007
See application file for complete search history.

(56) References Cited

U.S. PATENT DOCUMENTS

| | | | | |
|---|---|---|---|---|
| 6,529,488 B1* | 3/2003 | Urs | ....................... | H04B 7/2615 370/330 |
| 7,336,967 B2* | 2/2008 | Kelly | .................. | H04L 12/2854 370/329 |
| 8,116,278 B2* | 2/2012 | Green | ..................... | H04L 5/003 370/330 |
| 8,144,643 B2* | 3/2012 | Miller | .................. | H04B 7/2041 370/316 |
| 8,295,153 B2* | 10/2012 | Nentwig | ............... | H04L 5/0007 370/204 |

(Continued)

FOREIGN PATENT DOCUMENTS

| | | |
|---|---|---|
| EP | 2 330 854 A1 | 6/2011 |
| WO | 2012/158548 A1 | 11/2012 |

*Primary Examiner* — Mark Rinehart
*Assistant Examiner* — Sanjay K Dewan
(74) *Attorney, Agent, or Firm* — Baker Hostetler LLP

(57) ABSTRACT

A method for sharing spectrum in a communication network, comprising at least two systems working in frequency ranges that can overlap at least partially and in one and the same geographic area, comprises at least the following steps: affiliating the first and second systems with a server; determining whether there is a constrained system and, if there is, assigning said constrained system a first spectral band, for a given geographic area; performing this assignment for all the geographic areas covered by the two systems; and identifying the non-constrained systems and, by applying sub-band priority and management rules, assigning, for each of the non-constrained systems and each defined geographic area, a spectral band for each of the systems, and in the case where it is impossible to find a spectral sub-band, generating an alarm.

11 Claims, 2 Drawing Sheets

(56) References Cited

U.S. PATENT DOCUMENTS

| | | | | |
|---|---|---|---|---|
| 8,385,286 B2 * | 2/2013 | Junell | ........... | H04W 16/14 370/252 |
| 8,521,087 B2 * | 8/2013 | Kim | ........... | H04W 24/10 370/329 |
| 8,620,383 B2 * | 12/2013 | Panchal | ........... | H04L 5/0096 370/329 |
| 8,625,477 B2 * | 1/2014 | Hakola | ........... | H04W 28/16 370/312 |
| 8,705,479 B2 * | 4/2014 | Ode | ........... | H04L 5/0007 370/208 |
| 8,730,833 B2 * | 5/2014 | Drucker | ........... | H04W 72/0453 370/252 |
| 8,855,080 B2 * | 10/2014 | Chen | ........... | H04L 27/0006 370/252 |
| 8,873,480 B2 * | 10/2014 | Ahmadi | ........... | H04W 72/1215 370/329 |
| 8,892,109 B2 * | 11/2014 | Panchal | ........... | H04W 16/14 370/329 |
| 8,897,253 B2 * | 11/2014 | Shin | ........... | H04L 5/001 370/329 |
| 8,908,659 B2 * | 12/2014 | Chen | ........... | H04W 72/1215 370/314 |
| 8,929,312 B2 * | 1/2015 | Tseng | ........... | H04W 72/082 370/329 |
| 8,934,439 B2 * | 1/2015 | Smith | ........... | H04W 16/14 370/252 |
| 8,938,240 B2 * | 1/2015 | Farhadi | ........... | H04W 16/14 370/230 |
| 9,066,238 B2 * | 6/2015 | Stanforth | ........... | H04W 16/14 |
| 9,107,232 B2 * | 8/2015 | Krishnaswamy | . | H04W 72/1215 |
| 9,253,778 B2 * | 2/2016 | Ye | ........... | H04W 72/0453 |
| 9,282,463 B2 * | 3/2016 | Farhadi | ........... | H04W 16/14 |
| 2009/0111388 A1 * | 4/2009 | Chen | ........... | H04W 16/14 455/70 |
| 2009/0161610 A1 | 6/2009 | Kang et al. | | |
| 2011/0009145 A1 * | 1/2011 | Pirinen | ........... | H04W 16/14 455/509 |
| 2012/0057533 A1 | 3/2012 | Junell et al. | | |
| 2014/0192685 A1 * | 7/2014 | Mueck | ........... | H04W 72/04 370/280 |
| 2016/0127913 A1 * | 5/2016 | Li | ........... | H04W 4/22 370/329 |

* cited by examiner

METHOD AND SYSTEM FOR SHARING RADIO SPECTRUM

CROSS-REFERENCE TO RELATED APPLICATION

This application claims priority to foreign French patent application No. FR 1303117, filed on Dec. 31, 2013, the disclosure of which is incorporated by reference in its entirety.

FIELD OF THE INVENTION

The object of the invention relates to a method and a system that make it possible to share the radio spectrum between several systems or between several networks which, in operation, are required to use one and the same spectral band or a portion of a spectral band.

BACKGROUND

One of the main problems linked to the management of the radio spectrum lies in the interferences that the transmission systems of a mobile network generate on the receiving systems of another broadcast network or of another mobile network. These interferences reduce the range and/or the quality of the transmissions.

The prior art known to the applicant consists, for example, in managing the spectrum statically, by conducting upstream studies of compatibility that make it possible to determine the conditions of use of these systems. The role of the international telecommunication union, or ITU, and of the CEPT (European Conference of Postal and Telecommunications Administrations) at the European level is to manage this coexistence. The coexistence is generally ensured by defining a transmission mask for each of the systems, and by adding thereto a guard band that makes it possible to consider the adjacent systems as isolated on the wireless plane. The problem resulting from this approach is two-fold: the spectrum is shared only statically and the guard band is generally significant.

Numerous studies are conducted on cognitive radio in general, the aim of which is to scan the wireless environment and exploit this information to use the spectrum that is left vacant. The main problem with this approach stems from the fact that the adjacent systems do not know one another, a priori, and that the spectrum access priority rules are generally not defined, unless a licence agreement, called LSA (licence scheme agreement), between a main user and a secondary user is defined. This agreement is specific between two users who use manual management to allocate the spectrum.

Another approach lies in the LTE technology (standardized by the Long Term Evolution 3GPP) known from the technical domain which has introduced a semi-static spectrum sharing technique between adjacent base stations. The spectrum allocation, or "load sharing", protocol is transported by an IP internet network, to which the base stations are connected. Each operator defines the rules for sharing the spectrum that it wants to use. In particular, the LTE offers the possibility of creating a broadcast sub-network over a predetermined set of geographic areas. This sub-network shares the spectrum and the physical layer with the point-to-point or unicast transmissions, over all the base stations of a geographic area. In the context of this technology, the semi-static spectrum sharing takes place only within a single system for which the spectrum access priority rules are identical. The broadcast sub-network uses the same transmission standard and the same equipment as the LTE.

Hereinafter in the description, the expression "constrained system" will denote a system for which the frequency band is fixed, and "a non-constrained system" denotes a system for which the frequency band is flexible, in width and/or in position in the spectrum, without needing to switch it off. The LTE technology particularly addresses this criterion.

In practice, such a system is commonly implemented by using an orthogonal sub-carrier modulation, but this type of implementation is not obligatory. The expression "adjacent" corresponds to an adjacency in the spectral sense of two systems having a common radio coverage area.

The term channelization is here synonymous with radio channel width. For a given radio system, the channelization is defined by the quantity of spectrum necessary for the transmission and includes necessary guard bands that make it possible to avoid interference with the adjacent systems. In the LTE system, the channelization is quantized and adopts a value from the set {1.4 MHz, 3 MHz, 5 MHz, 10 MHz, 15 MHz, 20 MHz}. The LTE system can be positioned in different frequency bands, typically the civil mobile communication bands allocated by the ITU, but can also be deployed in other bands defined by each band-owner state or official organization (e.g. NATO).

SUMMARY OF THE INVENTION

One of the objectives of the present invention is to propose a method that makes it possible to manage the dynamic sharing of the spectrum between several systems or between two networks which will be led to use the same base band.

The invention relates to a method for sharing spectrum in a communication network comprising at least one first network comprising first transmission systems $S_1$ and one second network comprising second transmission systems $S_2$, the networks working in frequency ranges that can overlap at least partially and in one and the same geographic area, resulting in the sharing of a spectral band, characterized in that it comprises at least the following steps:
  affiliating the at least first system and the at least second system with a server and communicating spectrum sharing rules thereto,
  determining whether there is a constrained system and, if there is, assigning said constrained system a first spectral sub-band of the shared spectral band, for a given geographic area, generating an alarm if this is not possible,
  performing this assignment for all the geographic areas covered by said constrained system,
  identifying the non-constrained systems and, by applying the spectrum sharing rules, assigning each of the non-constrained systems and each defined geographic area a spectral sub-band for each of the systems as a function of the geographic area covered by the network, and in the case where it is impossible to find a spectral sub-band, generating an alarm.

The non-constrained systems use, for example, an OFDM modulation with a bandwidth that is variable from one system to the other and a guard band is inserted at the level of the sub-band or sub-bands assigned to a system.

For the implementation of the method, an IP link is, for example, used between the server and said systems.

According to a variant embodiment, the method can implement spectrum sharing rules between two or more systems as a function of the date and time.

The method according to the invention is used for radio networks.

According to one embodiment, the method implements a spectrum allocation algorithm implemented by the server comprising the following steps:

Radio Transmission System Affiliation Request

Decoding:
  Of the area or areas of coverage provided, Zk,
  Of the frequency range in which the network operates, Bk,
  Of the capacity of the network to change frequency in the range,
  Of the capacity of the network to work with a variable bandwidth.

Identification of the Spectrum Sharing Networks as a Function:
  Of the geographic area Zi,
  Of the frequency range Bi, For Each Geographic Area Zi Affected by the New Network:
  Positioning the frequency-constrained systems,
  Determining, in the common frequency range, the best frequency of the new network, the one providing the greatest bandwidth, by taking into account its spectral capabilities,
  Determining the pairs of systems spectrally adjacent to the new network, For each System Adjacent to the Constrained System:
  Computing the necessary guard band taking into account the characteristics of the two types of systems,
  If both have fixed bandwidths, checking that this band is available, otherwise returning an alarm,
  If one has a variable band and the other has a fixed band, computing the maximum bandwidth of the system with variable bandwidth taking into account the guard band and taking into account the possibility of fixing or not fixing the width of the sub-carriers,
  If both have a variable band, computing the maximum bandwidths applicable to each of the systems.

For each System with Variable Width:
  Taking into account adjacencies, computing the authorized channelization widths,
  Indicating to the system the frequency, the channelizations, the IP access point, for example, of the system or systems with which the spectrum will be shared and the protocol applicable for the semi-static management of the inter-system spectrum.

The initialization step is, for example, executed as follows:

Reception of Configuration from the Server:
The server will indicate to each system the other systems that it will interact with:
  establishment of an IP link with the spectrum management sub-system of each of the systems present in the adjacent bands,
  starting up of the system with the previously computed sub-carrier frequency, bandwidth and channelization parameters,
  starting up of the spectrum sharing protocol with the other system with which the link is established.

BRIEF DESCRIPTION OF THE DRAWINGS

Other features and advantages of the device according to the invention will become more apparent on reading the following description of an exemplary embodiment given as a nonlimiting illustration with figures attached where.

DETAILED DESCRIPTION

Figure 1:
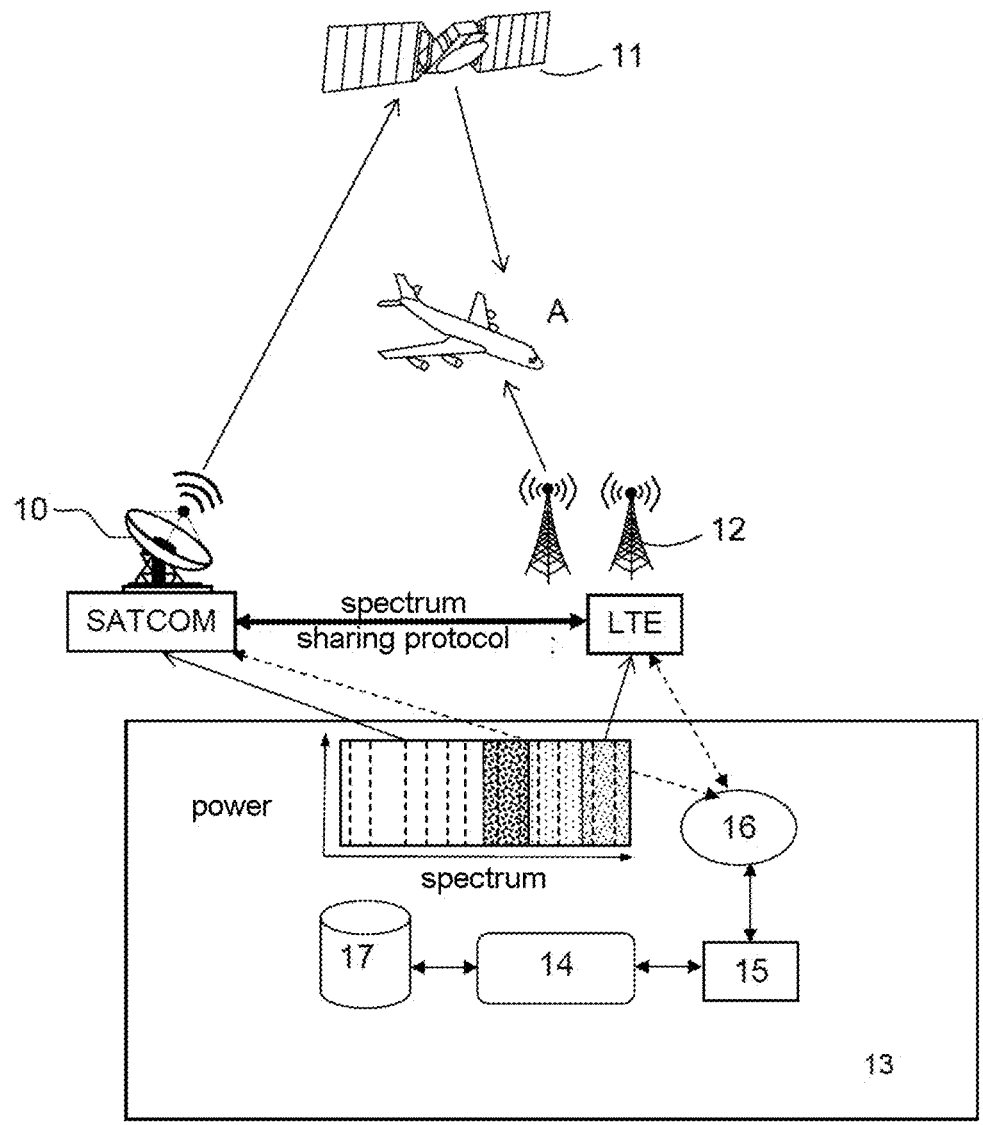
FIG. 1 represents an exemplary implementation of the method according to the invention.

FIG. 1 schematically represents an exemplary implementation of the method according to the invention for managing spectrum sharing by means, for example, of a server 13 linked to a first network 10 of Satcom type operated by a first operator communicating with a satellite 11 by appropriate means, and a second network 12 of LTE type operated by a second operator, available for users of an aeroplane A for example. The shared spectral band is, for example, the frequency interval[15-20 MHz]. The aeroplane A listens, for example, to the LTE ground network, or the Satcom network or even both and can be connected with both. In this context, first radio transmission systems $S_1$ will seek to be affiliated with the first network 10 and second radio transmission systems $S_2$ with the second network 12.

The server 13 comprises, for example, a processor 14 adapted for executing the steps of the method according to the invention, a system affiliation management module 15, a communication module 16 or module for data exchanges with Satcom and with the LTE-network. The server 13 has in memory 17 a set of spectrum allocation rules which are communicated by the systems which will be affiliated. The server will use these rules to allocate the spectrum and compute the guard bands, if necessary, to be inserted for the constrained systems, for example. Upon the affiliation of a system, the server will memorize the characteristics of the different systems at the time of their affiliation.

In the example given, the server 13 is centralized and globally manages the spectrum, in a given spectral range, over a given geographic area.

The first network and the second network are required to share a spectral band Bi which can be divided into N sub-bands SBI.

According to another variant embodiment, it could be possible to imagine, after the server has managed the spectrum sharing, that the affiliated systems or the networks communicate directly with one another to define the sub-bands that they will use. In this case, the networks or systems will communicate with one another by using the spectrum sharing protocol and rules that the server will have transmitted to them.

A system Sk is notably characterized by a frequency band $B_k$ that it uses, a geographic area $Z_k$ and a waveform $M_k$ for the communications, possibly by a priority criterion. For example, the priority could be linked to a time band of use in the day, assigned for each network. Each system considered in the description comprises transmission/reception means, a processor, means for communicating with at least the server and possibly with other affiliated systems which will use one and the same spectral band.

At a given instant, the server looks at the radio transmission systems or networks which generate an affiliation request. The server will memorize, for a given system $R_k$, its nature, whether it is a constrained system $R_{Ck}$ or a non-constrained system $R_{nCk}$, the frequency band that it needs $B_k$, the waveform that it uses $M_k$ and the geographic area $Z_k$ that it covers. The spectrum sharing rules and modalities are communicated to the server by each network or system after their affiliation.

To sum up, for each system or for each network, $R_k$, the server will execute, for example, the following steps:

For any affiliated $R_k$
is $R_k$ a constrained system?

Figure 2:
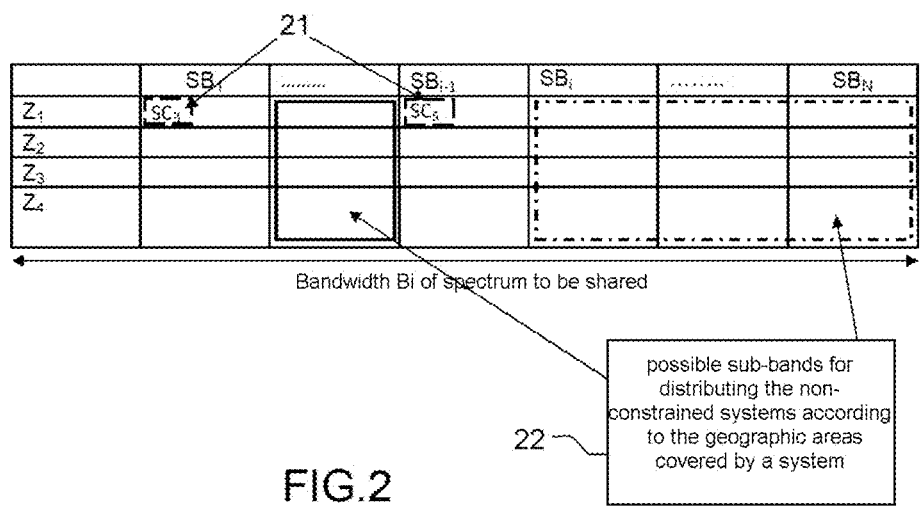
FIG. 2 represents an example of spectrum allocation.

If yes, then the server takes into account the requested spectral band $B_k$ and the geographic area $Z_k$, and looks to see if a sub-band of the shared spectrum Bi corresponds to the request from $R_{Ck}$, if it does, it allocates the sub-band to the system $R_{ck}$, and determines the guard bands to be inserted, if it is not a constrained system, then the server will search to see if there is another affiliated constrained network, if there is, it will search to see if it is possible to assign it a sub-band of the spectrum, after having considered all the systems which are affiliated to it, the server has assigned the affiliated constrained systems $R_{ck}$ one or more spectral sub-bands, 21 in FIG. 2, as a function of the geographic area associated with the system, the server then considers the non-constrained systems $R_{nck}$, it applies the assignment rules, considers the available sub-bands remaining after assignment for the constrained systems, areas 21 in FIG. 2 and will look, for each non-constrained system $R_{nck}$ to see if there is, for a geographic area $Z_k$, an available frequency sub-band of $SB_k$, if there is, then it assigns to this system $R_{nck}$ a sub-band $SB_k$, otherwise it will return an alarm reflecting the inability to assign a sub-band of the spectrum.

The spectrum allocation algorithm implemented by the server comprises, for example, the steps described below:

Radio Transmission System Affiliation Request, for Example

Decoding:
    Of the area or areas of coverage provided, Zk,
    Of the frequency range in which the network operates, Bk,
    Of the capacity of the network to change frequency in the range,
    Of the capacity of the network to work with a variable bandwidth Identification of the Spectrum Sharing Networks as a Function:
    Of the geographic area Zi,
    Of the frequency range Bi.

For each Geographic Area Zi Affected by the New Network:
    Positioning the frequency-constrained systems (e.g. operator),
    Determining, in the common frequency range, the best frequency of the new network, the one providing the greatest bandwidth, by taking into account its spectral capabilities,
    Determining the pairs of systems spectrally adjacent to the new network.

For each System Adjacent to the Constrained System:
    Computing the necessary guard band taking into account the characteristics of the two types of systems,
    If both have fixed bandwidths→checking that this band is available, otherwise returning an alarm,
    If one has a variable band and the other has a fixed band→computing the maximum bandwidth of the system with variable bandwidth taking into account the guard band and taking into account the possibility of fixing or not fixing the width of the sub-carriers,
    If both have a variable band→computing the maximum bandwidths applicable to each of the systems.

For each System with Variable Width:
    Taking into account adjacencies, computing the authorized channelization widths,
    Indicating to it the frequency, the channelizations, the IP access point, for example, of the system or systems with which the spectrum will be shared and the protocol applicable for the semi-static management of the inter-system spectrum.

Without departing from the framework of the invention, it could also be possible to apply these different steps to the affiliation of a network.

The initialization of the method can be executed as follows:

Reception of a Configuration from the Server:

The server will indicate to each system the other system with which it will interact:
    establishment of an IP link with the spectrum management sub-system of each of the systems present in the adjacent bands,
    starting up of the system with the previously computed sub-carrier frequency, bandwidth and channelization parameters,
    starting up of the spectrum sharing protocol with the other system with which the link is established.

According to a variant embodiment, the spectrum sharing can be dynamic and the server can apply spectrum sharing rules between two systems as a function of the date and time.

In the case of a constrained system, the type of modulation used need not be an OFDM modulation, and, in this case, the server will determine the guard band to be inserted for a given constrained system by taking into account spectrally adjacent systems of the system.

In the case of adjacent non-constrained systems which use the OFDM modulation but with bandwidths that are variable from one system to another, it will in certain cases be necessary to introduce a guard band as a function of the respective radio characteristics of the systems.

In the case of adjacent non-constrained systems, which would, in addition, be inclined to dynamically set the channelization of the sub-carriers, the implementation of the negotiation protocol can make it possible to fix the value of the channel width of the sub-carriers between two systems for each geographic area. This advantageously makes it possible to produce an orthogonalization in the geographic areas where two systems are simultaneously present, without needing to introduce any guard band between the two systems.

The implementation of an automatic inter-system negotiation protocol makes it possible to fix the absolute frequency of one relative to the other in such a way that the sub-carriers are effectively orthogonal.

The system will be able to use a modulation of SOFDM type.

The examples described previously apply for systems with a 15 KHz OFDMA frequency modulation, as applied by the LTE technology.

Figure 3:
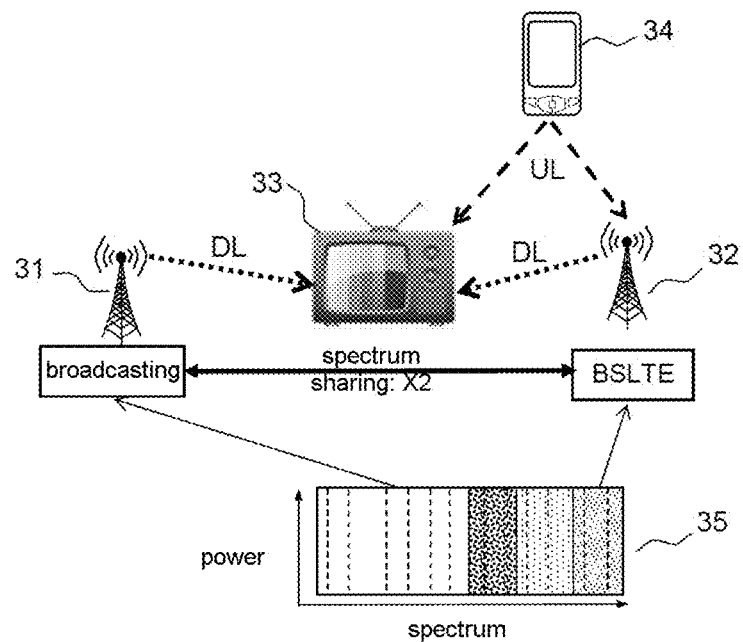
FIG. 3 represents another exemplary implementation of the method according to the invention.

FIG. 3 schematically represents an exemplary implementation of the method according to the invention in the case of a temporary and localized reduction of the broadcast capacity for digital television or TNT. In this example, a broadcast system, 31, will for example be used with an orthogonal frequency compatible with the physical layer, PHY, of the LTE network, an OFDM modulation with 15 KHz sub-carrier. In this figure, the interference without implementation of the method occurs on the TNT receiver, 33, which receives both the broadcast originating from the system 31 and between the uplink UL transmission, 34, of the mobile terminals. The transmission band of the terminal is in fact adjacent to the reception band of the TNT receiver.

In case of necessity, and if the spectrum sharing rules prioritize a use for civil safety, the TNT broadcast will free up a part of the spectrum in the geographic area concerned. This spectrum will be able to be used for security networks, for example for civilian security, video surveillance, etc. In a particular exemplary deployment, the spectrum shared between the TNT and the LTE system over the national territory covers a band of 9 MHz. The TNT has frequency capacities below this band, covering a spectrum of several tens of MHz. The LTE system, used by the civil security forces, has a specific spectrum of 3 MHz above this 9 MHz band. In normal times, this spectrum is used only by the TNT transmitters. In case of important intervention requiring the use of critical communications, the security forces may ask, via the system 35, for the TNT transmitters broadcasting over the area of intervention to free up spectrum, up to 9 MHz, in favour of the LTE system for the duration of the intervention. At the end of the intervention, the LTE system indicates that the spectrum is once again available, only the specifically dedicated 3 MHz remain useable by the security forces. This variant allows for a dynamic sharing of the spectrum for the downlink DL or uplink UL direction. It will be possible to use the standardized $X_2$ interface of the LTE The method according to the invention is notably used to provide a spectrum management interface that takes on board the spectrum sharing of the 3GPP TS 36.423 form that is known to those skilled in the art and that extends this standard: between 3GPP (LTE) and non-3GPP systems, i.e. Satcom, broadcast TV. The method will allow this communication, not as a function of an X2 link between two transmission equipment items but between two spectrum management and supervision equipment items in the geographic areas in which these systems transmit.

Advantages

The method according to the invention makes it possible to manage spectrum sharing between several radio means established in adjacent bands. The invention thus offers more availability of the spectrum for critical communications. When the systems have the same physical layer, the use of a guard band can be avoided.

The invention claimed is:

1. A method for sharing spectrum in a communication network including at least one first network including first transmission systems $S_1$ and one second network including second transmission systems $S_2$, the first and the second networks working in frequency ranges that overlap at least partially and lie in one and the same geographic area, resulting in a sharing of a spectral band, the method comprising at least the following steps:
    affiliating at least a first transmission system and at least a second transmission system with a server and communicating spectrum sharing rules;
    determining whether there is a constrained system defined as having a fixed frequency band, and, when there is, assigning to said constrained system a first spectral sub-band of the shared spectral band, for a given geographic area, or generating an alarm when said assigning is not possible;
    performing said assigning for all geographic areas covered by said constrained system; and
    identifying non-constrained systems defined as having flexible frequency bands of variable widths and/or positions in the spectral band, and, by applying the communication spectrum sharing rules, assigning to each of the non-constrained systems and each defined geographic area, a spectral sub-band for each of the first and second transmission systems as a function of the geographic area covered by the communication network, and when said spectral sub-band cannot be found, generating another alarm.

2. The method according to claim 1, wherein the non-constrained systems use an Orthogonal Frequency Division Multiplexing (OFDM) modulation with a bandwidth that is variable from one system to another, and wherein a guard band is inserted at level of a sub-band or sub-bands assigned to a given non-constrained system.

3. The method according to claim 2, wherein the spectrum sharing rules are used between two or more transmission systems as a function of a date and a time.

4. The method according to claim 1, wherein an Internet Protocol (IP) link is used between the server and said first and second transmission systems.

5. The method according to claim 1, wherein the spectrum sharing rules are used between two or more transmission systems as a function of a date and a time.

6. The method according to claim 1, wherein the first and the second networks are radio networks.

7. The method according to claim 1, wherein the first and the second transmission systems use a 15 KHz, OFDMA frequency modulation, as applied by a Long Term Evolution (LTE) technology.

8. The method according to claim 1, wherein the method implements a spectrum allocation algorithm implemented by the server comprising the following steps:
    receiving a radio transmission system affiliation request, said receiving including:
        decoding:
            of the geographic area or areas of coverage provided, Zk,
            of the frequency range in which the communication network operates, Bk,
            of the capacity of the communication network to change frequency in the frequency range,
            of the capacity of the communication network to work with a variable bandwidth;
    identifying spectrum sharing networks as a function:
        of the geographic area Zi,
        of the frequency range Bi;
    for each geographic area Zi affected by a new network:
        positioning the constrained systems,
        determining, in a common frequency range, a best frequency of the new network, said best frequency being the one providing the greatest bandwidth, by taking into account spectral capabilities of the new network,
        determining pairs of systems spectrally adjacent to the new network;
    for each system adjacent to the constrained system:
        computing a guard band taking into account characteristics of the pairs of systems,
        if both systems in the pairs of systems have fixed bandwidths, checking that the guard band is available, otherwise returning an alarm,
        if one system in the pairs of systems has a variable band and the other has a fixed band, computing a maximum bandwidth of the system with a variable bandwidth taking into account the guard band and taking into account the width of sub-carriers are fixable,
        if both systems have a variable band, computing maximum bandwidths applicable to each of the pairs of systems;

for each system with the variable bandwidth:
  taking into account adjacencies, computing an authorized channelization widths,
  indicating to said each system the frequency, the channelization widths, an Internet Protocol (IP) access point of the system or systems with which the spectrum will be shared and a protocol applicable for a semi-static management of an inter-system spectrum.

9. The method according to claim 8, wherein, for the initialization step, the server indicates to each system the other systems with which it will interact, then the step is executed as follows:
  establishment of an IP link with the spectrum management sub-system of each of the systems present in the adjacent bands,
  starting up of the system with previously computed sub-carrier frequency, bandwidth and channelization parameters,
  starting up of the spectrum sharing protocol with the other system with which the link is established.

10. A system for implementing the method according to claim 1 comprising a server linked to a first network operated by a first operator communicating with a satellite by appropriate means, and a second network operated by a second operator, the server comprising a processor adapted for executing the steps of the method, a system affiliation management module, a communication module, a memory of a set of spectrum allocation rules which are communicated by the systems to be affiliated.

11. The system according to claim 10, wherein the second network is a Long Term Evolution (LTE) network.

* * * * *